United States Patent
Ikeda et al.

(10) Patent No.: US 9,896,357 B2
(45) Date of Patent: Feb. 20, 2018

(54) ELECTRODEIONIZATION APPARATUS FOR PRODUCING DEIONIZED WATER

(75) Inventors: Naho Ikeda, Tokyo (JP); Yuji Asakawa, Tokyo (JP); Keisuke Sasaki, Tokyo (JP); Kazuya Hasegawa, Tokyo (JP)

(73) Assignee: ORGANO CORPORATION, Tokyo (JP)

(*) Notice: Subject to any disclaimer, the term of this patent is extended or adjusted under 35 U.S.C. 154(b) by 516 days.

(21) Appl. No.: 14/236,690

(22) PCT Filed: Aug. 1, 2012

(86) PCT No.: PCT/JP2012/069539
§ 371 (c)(1),
(2), (4) Date: Mar. 26, 2014

(87) PCT Pub. No.: WO2013/018818
PCT Pub. Date: Feb. 7, 2013

(65) Prior Publication Data
US 2014/0202867 A1 Jul. 24, 2014

(30) Foreign Application Priority Data
Aug. 4, 2011 (JP) ................................. 2011-170943

(51) Int. Cl.
*C02F 1/469* (2006.01)
*B01D 61/44* (2006.01)
(Continued)

(52) U.S. Cl.
CPC .......... *C02F 1/4695* (2013.01); *B01D 61/445* (2013.01); *B01D 61/485* (2013.01); *C02F 1/441* (2013.01)

(58) Field of Classification Search
CPC .... C02F 1/4695; B01D 61/445; B01D 61/485
See application file for complete search history.

(56) References Cited

U.S. PATENT DOCUMENTS 4,871,431 A * 10/1989 Parsi ................... B01D 61/445
204/524
2002/0189951 A1 12/2002 Liang et al.
(Continued)

FOREIGN PATENT DOCUMENTS

EP 1 642 867 4/2006
JP 01-151911 6/1989
(Continued)

OTHER PUBLICATIONS

Japan Office action in JP 2013-526939, and partial English translation, dated Sep. 2, 2014.
(Continued)

*Primary Examiner* — Ibrahime A Ambraham
*Assistant Examiner* — Salil Jain
(74) *Attorney, Agent, or Firm* — Greenblum & Bernstein, P.L.C.

(57) ABSTRACT

Provided is an electrodeionization apparatus for producing deionized water, capable of removing or reducing a biased flow of electric current in a deionization chamber. In the electrodeionization apparatus for producing deionized water, at least one deionization treatment unit including the deionization chamber and a pair of concentration chambers adjacent to both sides of the deionization chamber is disposed between a cathode and an anode. In the deionization chamber, anion exchanger layers and cation exchanger layers are stacked in an order in which a last ion exchanger layer through which water to be treated passes is an anion exchanger layer. A bipolar membrane is formed on the cathode side of the anion exchanger layer in the deionization chamber. The anion exchange membrane of the bipolar membrane is in contact with the anion exchanger layer.

2 Claims, 6 Drawing Sheets

(51) Int. Cl.
   *B01D 61/48* (2006.01)
   *C02F 1/44* (2006.01)

(56) References Cited

U.S. PATENT DOCUMENTS

| 2004/0089551 A1 | 5/2004 | Liang et al. |
| 2004/0122117 A1 | 6/2004 | Yamanaka et al. |
| 2007/0045196 A1 | 1/2007 | Kawaguchi |
| 2007/0278099 A1 | 12/2007 | Barber |
| 2011/0005933 A1 | 1/2011 | Kawaguchi |

FOREIGN PATENT DOCUMENTS

| JP | 04-071683 | | 3/1992 |
| JP | 2003-190820 | | 7/2003 |
| JP | 2003-326272 | | 11/2003 |
| JP | 2005-052766 | | 3/2005 |
| JP | 2005-052767 | | 3/2005 |
| JP | 2005052766 A | * | 3/2005 |
| JP | 2005-508729 | | 4/2005 |
| JP | 2005-254225 | | 9/2005 |
| JP | 2009-241024 | | 10/2009 |
| JP | 2009-539578 | | 11/2009 |
| JP | 2010-234358 | | 10/2010 |
| JP | 2010-234362 | | 10/2010 |
| JP | 2010234358 A | * | 10/2010 |
| JP | 2010-264360 | | 11/2010 |
| JP | 2010-284639 | | 12/2010 |
| JP | 2011-251266 | | 12/2011 |
| WO | 02/083770 | | 10/2002 |
| WO | 02/096807 | | 12/2002 |
| WO | 2007/143296 | | 12/2007 |
| WO | 2011/152226 | | 12/2011 |
| WO | 2011/152227 | | 12/2011 |
| WO | 2012/108310 | | 8/2012 |

OTHER PUBLICATIONS

International Search Report dated Nov. 13, 2012 in PCT/2012/069539 (With English version).
EP Search report in EP 12820613 dated Mar. 30, 2015.

* cited by examiner (a)

(b)

(c)

(a)

(b)

ELECTRODEIONIZATION APPARATUS FOR PRODUCING DEIONIZED WATER

TECHNICAL FIELD

The present invention relates to an electrodeionization apparatus for producing deionized water, and more particularly to the structure of a deionization chamber.

BACKGROUND ART

Conventionally, there has been known a deionized water production apparatus that passes water to be treated through an ion exchanger to perform deionization. In such a deionized water production apparatus, when the ion-exchange group of the ion exchanger is saturated to lower deionization performance, the ion-exchange group must be regenerated by chemicals (acid or alkali). Specifically, an anion or a cation adsorbed on the ion-exchange group must be replaced with $H^+$ or $OH^-$ derived from the acid or the alkali. Recently, to remove such operational disadvantages, an electrodeionization apparatus for producing deionized water that eliminates the necessity of regeneration by chemicals has been put into practical use.

The electrodeionization apparatus for producing deionized water is an apparatus combining electrophoresis with electrodialysis. The basic configuration of a general electrodeionization apparatus for producing deionized water is as follows. That is, the electrodeionization apparatus for producing deionized water includes a deionization chamber, a pair of concentration chambers adjacent to both sides of the deionization chamber, a cathode chamber disposed outside one of the concentration chambers, and an anode chamber disposed outside the other concentration chamber. The deionization chamber includes an anion exchange membrane and a cation exchange membrane arranged oppositely to each other, and an ion exchanger (anion exchanger and/or cation exchanger) filled between these exchange membranes. Hereinafter, the electrodeionization apparatus for producing deionized water may be abbreviated to a "deionized water production apparatus".

To produce deionized water by using the deionized water production apparatus having the aforementioned configuration, water to be treated is passed into the deionization chamber when DC voltage is applied between electrodes that are respectively arranged in the cathode chamber and the anode chamber. In the deionization chamber, an anion component ($Cl^-$, $CO_3^{2-}$, $HCO_3^-$, or $SiO_2$) is captured by the anion exchanger, and a cation component ($Na^+$, $Ca^{2+}$, or $Mg^{2+}$) is captured by the cation exchanger. Simultaneously, water-splitting reaction occurs at an interface between the anion exchanger and the cation exchanger in the deionization chamber to generate a hydrogen ion and a hydroxide ion ($H_2O \rightarrow H^+ + OH^-$). The ion components captured by the ion exchangers are replaced with the hydrogen ion and the hydroxide ion to be released from the ion exchangers. Released ion components are electrophoresed through the ion exchanger to the ion exchange membrane (anion exchange membrane or cation exchange membrane), and subjected to electrodialysis at the ion exchange membrane and then move into the concentration chamber. The inn components that have moved into the concentration chamber is discharged together with concentrated water flowing in the concentration chamber.

The most of the voltage that is applied to the deionized water production apparatus is used for the water-splitting reaction. Accordingly, to achieve an operation with a low voltage and a high current density, the water-splitting reaction is desirably expedited. With regard to this point, it is recognized that the water-splitting reaction in the deionization chamber can be expedited by disposing a bipolar membrane in the deionization chamber.

Patent Literature 1 describes an example of the deionized water production apparatus where the bipolar membrane is disposed in the deionization chamber. As shown in FIG. 6, the deionized water production apparatus described in Patent Literature 1 includes a pair of concentration chambers C1 and C2, and deionization chamber D provided between the pair of concentration chambers C1 and C2. In FIG. 6, a cathode chamber and an anode chamber are not shown. In deionization chamber D, single anion exchanger A and mixture M of an anion exchanger and a cation exchanger are stacked along the passing direction of water to be treated. In other words, the passing-direction upstream side of the water to be treated is filled with the anion exchanger in a single bed form, while the passing-direction downstream side is filled with the anion exchanger and the cation exchanger in a mixed bed form. Further, bipolar membrane BP is partially disposed in deionization chamber D. Specifically, in a region filled with anion exchanger A, bipolar membrane BP is disposed so that anion exchange membrane 1 can be in contact with anion exchanger A.

If ion exchanger layers having the polarity different types are stacked in the deionization chamber, the excess voltage necessary for the water-splitting reaction will vary from one layer to another and thus a biased flow of electric current causes. Hereinbelow, an ion exchanger layer including only a cation exchanger may be referred to as a "cation layer", and an ion exchanger layer including only an anion exchanger may be referred to as an "anion layer". An ion exchanger layer including a mixture of a cation exchanger and an anion exchanger may be referred to as a "mixed layer".

When the cation layer, the anion layer and the mixed layer are compared with one another as regards electric resistance, electric resistances are gradually higher in the order of the cation layer, the anion layer and the mixed layer. In other words, the electric resistance of the anion layer is lower than that of the mixed layer. This means that in the deionized water production apparatus shown in FIG. 6, the anion layer lower in electric resistance than the mixed layer is in contact with the bipolar membrane. Consequently, the biased flow of electric current is more conspicuous.

It is therefore an object of the present invention to prevent a biased flow of electric current in the deionized water production apparatus, and enable an operation having a low voltage and high electric current density.

CITATION LIST

Patent Literature 1: JP2005-52766A (paragraph [0031] and FIG. 2)

SUMMARY OF INVENTION

An electrodeionization apparatus for producing deionized water includes at least one deionization treatment unit including a deionization chamber and a pair of concentration chambers adjacent to both sides of the deionization chamber and disposed between a cathode and an anode. In the deionization chamber, anion exchanger layers and cation exchanger layers are stacked in the order in which the last ion exchanger layer, through which water to be treated passes, is an anion exchanger layer. Further, a bipolar membrane is provided on the cathode side of the anion exchanger layer in the deionization chamber. The anion exchange membrane of the bipolar membrane is in contact with the anion exchanger layer.

According to the present invention, a biased flow of electric current in the deionized water production apparatus can be prevented, and an operation can be performed with a low voltage and a high current density.

The above and other objects, features and advantages of the present invention will become apparent in the following description read in connection with the accompanying drawings.

DESCRIPTION OF EMBODIMENTS

First Embodiment

Figure 1:
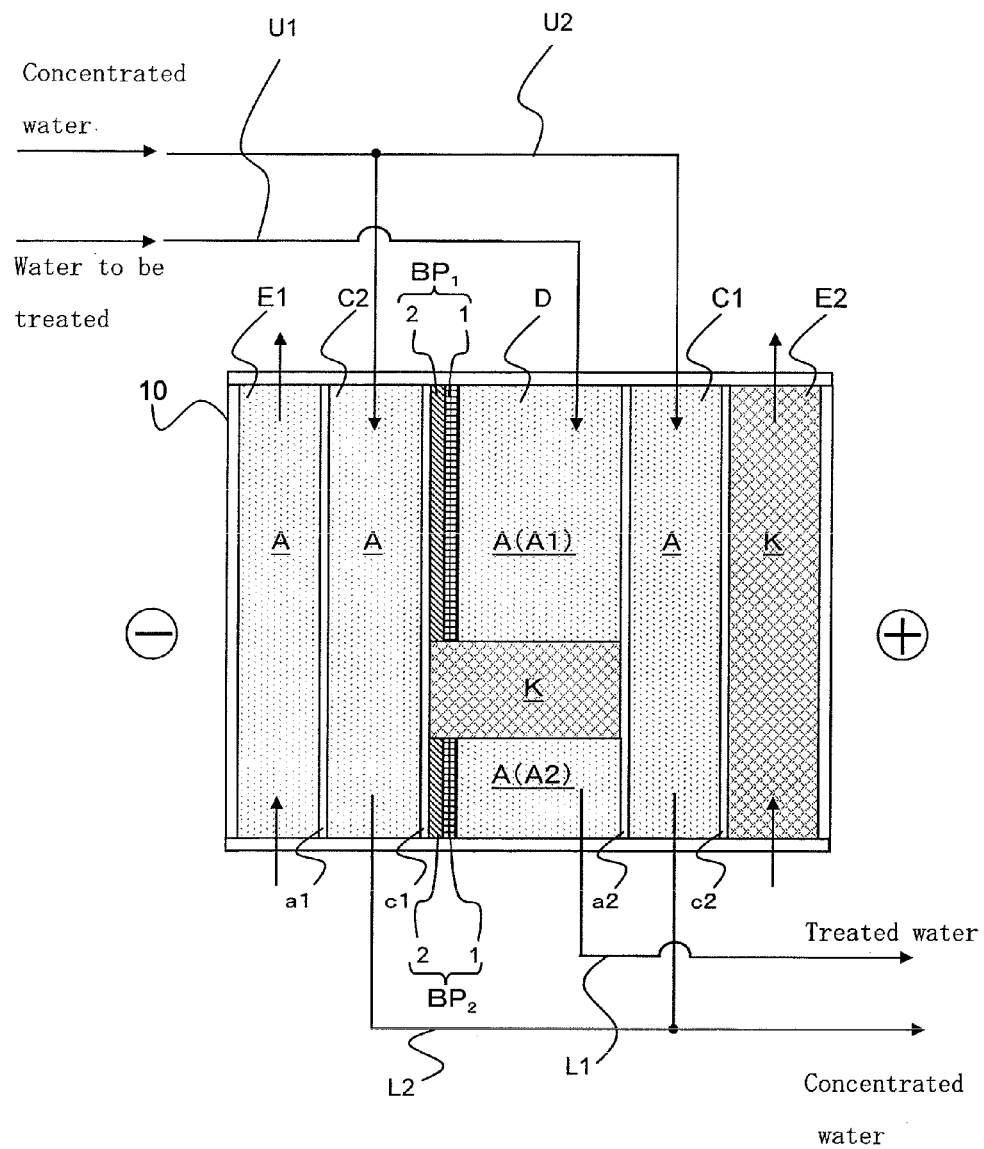
FIG. 1 is a schematic configuration view showing an example of a deionized water production apparatus according to an embodiment of the present invention.

Hereinafter, an example of a deionized water production apparatus according to an embodiment of the present invention will be described. FIG. 1 is a schematic block diagram showing the deionized water production apparatus according to the embodiment. The deionized water production apparatus shown in FIG. 1 includes a deionization treatment unit disposed between cathode chamber E1 including a cathode and anode chamber E2 including an anode. The deionization treatment unit includes deionization chamber D and a pair of concentration chambers C1 and C2 adjacent to both sides of deionization chamber D.

The respective chambers are formed by partitioning the inside of frame work 10 into a plurality of spaces by a plurality of ion exchange membranes, and are arranged adjacent to each other via the ion exchange membranes. The arrangement state of the chambers is as follows from cathode chamber E1 side. That is, cathode chamber E1 is adjacent to concentration chamber C2 via first anion exchange membrane a1, and concentration chamber C2 is adjacent to deionization chamber D via first cation exchange membrane c1. Deionization chamber D is adjacent to concentration chamber C1 via second anion exchange membrane a2, and concentration chamber C1 is adjacent to anode chamber E2 via second cation exchange membrane c2.

A cathode is housed in cathode chamber E1. The cathode is a metallic net or plate, for example, a stainless mesh or plate.

An anode is housed in anode chamber E2. The anode is a metallic net or plate. When water to be treated contains Cl$^-$, chlorine is generated in the anode. Thus, a material having chlorine resistance is desirably used for the anode. An example is a metal such as platinum, palladium or iridium, or a material made of titanium which is covered by such a metal.

Electrode water is supplied to cathode chamber E1 and anode chamber E2. The electrode water generates a hydrogen ion and a hydroxide ion by electrolysis near the electrodes. To suppress electric resistance in the deionized water production apparatus, cathode chamber E1 and anode chamber E2 are desirably filled with ion exchangers. Thus, in the embodiment, cathode chamber E1 is filled with anion exchanger A in a single bed form, and anode chamber E2 is filled with cation exchanger K in a single bed form.

Concentration chambers C1 and C2 are provided for capturing an anion component or a cation component discharged from deionization chamber D and for discharging the component out of the system. Concentration chambers C1 and C2 are each filled with anion exchanger A in a single bed form to prevent generation of scales.

Deionization chamber D is filled with anion exchanger A and cation exchanger K in a multi-layered bed form. Specifically, the layer of anion exchanger A (hereinafter, referred to as "anion layer A") and the layers of cation exchanger K (hereinafter, referred to as "cation layer K") are alternately stacked along the passing direction of the water that is to be treated. More specifically, first anion layer A1 is disposed at the front stage of the water passing direction, cation layer K is disposed at the middle stage of the water passing direction, and second anion layer A2 is disposed at the rear stage of the water passing direction. In other words, the water to be treated that has flowed into deionization chamber D passes through anion layer A1, cation layer K, and anion layer A2 in this order. In short, in deionization chamber D, three or more ion exchanger layers are stacked in an order in which the last ion exchanger, through which the water that is to be treated passes, is an anion exchanger.

Further, in deionization chamber D, two bipolar membranes BP are arranged. Specifically, first bipolar membrane $BP_1$ is disposed between anion layer A1 and first cation exchange membrane c1. Second bipolar membrane $BP_2$ is disposed between anion layer A2 and first cation exchange membrane c1. Bipolar membrane BP, which is an ion exchange membrane formed by sticking anion exchange membrane 1 and cation exchange membrane 2 together to integrate them, has the characteristic of rapidly accelerating the water-splitting reaction on the joined surface of anion exchange membrane 1 and cation exchange membrane 2. As shown in FIG. 1, first bipolar membrane $BP_1$ is disposed so that anion exchange membrane 1 can be in contact with first anion layer A1. Second bipolar membrane $BP_2$ is disposed so that anion exchange membrane 1 can be in contact with second anion layer A2. No bipolar membrane is disposed between cation layer K and first cation exchange membrane c1.

In FIG. 1, frame work 10 is shown integrally. In reality, however, different frame works are arranged for the respective chambers, and the frame works are bonded to each other. There is no particular limitation on the material of frame work 10 as long as the material is insulative and capable of reducing leakage of the water to be treated. An example is a resin of polyethylene, polypropylene, polyvinyl chloride, ABS, polycarbonate, or m-PPE (modified polyphenylene ether).

Next, an outline of the main flow of the water to be treated, treated water, and concentrated water in the deionized water production apparatus shown in FIG. 1 will be described. The water to be treated is passed through a RO (Rverse Osmosis) membrane to be supplied into deionization chamber D, and is passed through deionization chamber D. The water to be treated, which has passed through deionization chamber D, is discharged out of the system as treated water. The concentrated water is supplied to concentration chamber C1 and concentration chamber C2 in parallel, and is passed through concentration chambers C1 and C2 to be discharged out of the system.

Some flow channels U1 and U2 and L1 and L2 are arranged for supplying the water to be treated, the treated water, and the concentrated water as described above. In FIG. 1, flow channel U1 shown above the deionized water production apparatus has one end connected to the supply port of the water to be treated, and the other end connected to deionization chamber D. Flow channel L1 shown below the deionized water production apparatus has one end connected to deionization chamber D, and the other end connected to the discharge port of the treated water. Flow channel U2 shown above the deionized water production apparatus has one end connected to the supply port of the concentrated water, and the other end side branched in the midway to be connected to concentration chambers C1 and C2. Flow channel L2 shown below the deionized water production apparatus has one end connected to concentration chambers C1 and C2, and the other end side merged midway to be connected to the discharge port of the concentrated water. Though not shown, a flow channel for supplying electrode water and a flow channel for discharging the supplied electrode water are respectively connected to cathode chamber E1 and anode chamber E2.

Next, the operation and the effect of the deionized water production apparatus having the aforementioned configuration will be described. The concentrated water is supplied through flow channel U2 to concentration chamber C1 and concentration chamber C2, and discharged from flow channel L2. The electrode water is supplied through a not-shown flow channel to cathode chamber E1 and anode chamber E2, and the supplied electrode water is discharged from a not-shown flow channel. Further, a predetermined DC voltage is applied between the cathode and the anode.

In the aforementioned state, the water to be treated is supplied through flow channel U1 to deionization chamber D. An anion component ($Cl^-$, $CO_3^{2-}$, $HCO_3^-$, or $SiO_2$) and a cation component ($Na^+$, $Ca^{2+}$, or $Mg^{2+}$) in the supplied water to be treated are captured during the process when water to be treated is passed through deionization chamber D. The anion component captured in deionization chamber D moves to adjacent concentration chamber C1 via deionization chamber D and via second anion exchange membrane a2, and then is discharged out of the system together with the concentrated water passed through concentration chamber C1. The cation component captured in deionization chamber D moves to adjacent concentration chamber C2 via deionization chamber D and via first cation exchange membrane c1, and then is discharged out of the system together with the concentrated water passed through concentration chamber C2.

As described above, in deionization chamber D, first anion layer A1, cation layer K and second anion layer A2 are stacked in this order. Accordingly, the water to be treated supplied into deionization chamber D first passes through first anion layer A1, then through cation layer K, and lastly through second anion layer A2. In this case, during the process in which water to be treated is passed through each layer, the anion component or the cation component is removed as described above.

As described above, a biased flow of electric current occurs when ion exchanger layers having the polarity different types are stacked in deionization chamber D. Also as described above, when the electric resistance of the cation and anion layers are compared, the electric resistance of the anion layer is higher than that of the cation layer. The electric resistance of anion layer A shown in FIG. 1 is higher than that of cation layer K shown in FIG. 1. Thus, in the deionized water production apparatus according to the embodiment, bipolar membrane BP is disposed between anion layer A of deionization chamber D and first cation exchange membrane c1 adjacent to anion layer A. Further, each bipolar membrane BP is disposed so that anion exchange membrane 1 can be in contact with anion layer A. In other words, two anion layers A1 and A2 in deionization chamber D are connected not to first cation exchange membrane c1 but to anion exchange membrane 1 of bipolar membranes $BP_1$ and $BP_2$. Thus, the biased flow of electric current is removed or reduced due to increases in the amount of current that flows through anion layers A1 and A2. No bipolar membrane is disposed between cation layer K and the ion exchange membrane.

Further, in the deionized water production apparatus according to the embodiment, the water to be treated passes through first anion layer A1, then through cation layer K, and through second anion layer A2. In other words, in the deionized water production apparatus according to the embodiment, the water to be treated alternately passes through the anion layers and the cation layer.

The anion component capturing performance of the anion exchanger is high when pH of the water to be treated is low, and the cation component capturing performance of the cation exchanger is high when pH of the water to be treated is high. Thus, according to the configuration of the embodiment where the water to be treated passes through anion layer A1, cation layer K, and second anion layer A2 in this order, the anion component is removed by the passage through anion layer A1, and the water to be treated in which pH has increased then passes through cation layer K. Accordingly, cation removal reaction is expedited in cation layer K. Further, the cation component is removed by the passage through cation layer K, and the water to be treated in which pH has decreased then passes through anion layer A2. Accordingly, anion removal reaction is expedited in anion layer A2. In other words, the removal performance of both the anion component and the cation component is improved, and the purity of the treated water is further improved.

In the deionized water production apparatus according to the embodiment, the bipolar membrane is formed on the predetermined ion exchange membrane. However, a part of the ion exchange membrane can be replaced with a bipolar membrane, and operation effects similar to those described above can be provided by the replacement. For example, a part (part in contact with anion layer A1 or A2) of first cation exchange membrane c1 shown in FIG. 1 can be replaced with a bipolar membrane.

Second Embodiment

Hereinafter, another example of a deionized water production apparatus according to the embodiment of the present invention will be described referring to the drawings. The deionized water production apparatus according to this embodiment has a configuration similar to that of the deionized water production apparatus according to the first embodiment except for inclusion of a plurality of deionization treatment units between a cathode chamber and an anode chamber. Thus, only components different from those of the deionized water production apparatus according to the first embodiment will be described, while description of similar components will be omitted.

Figure 2:
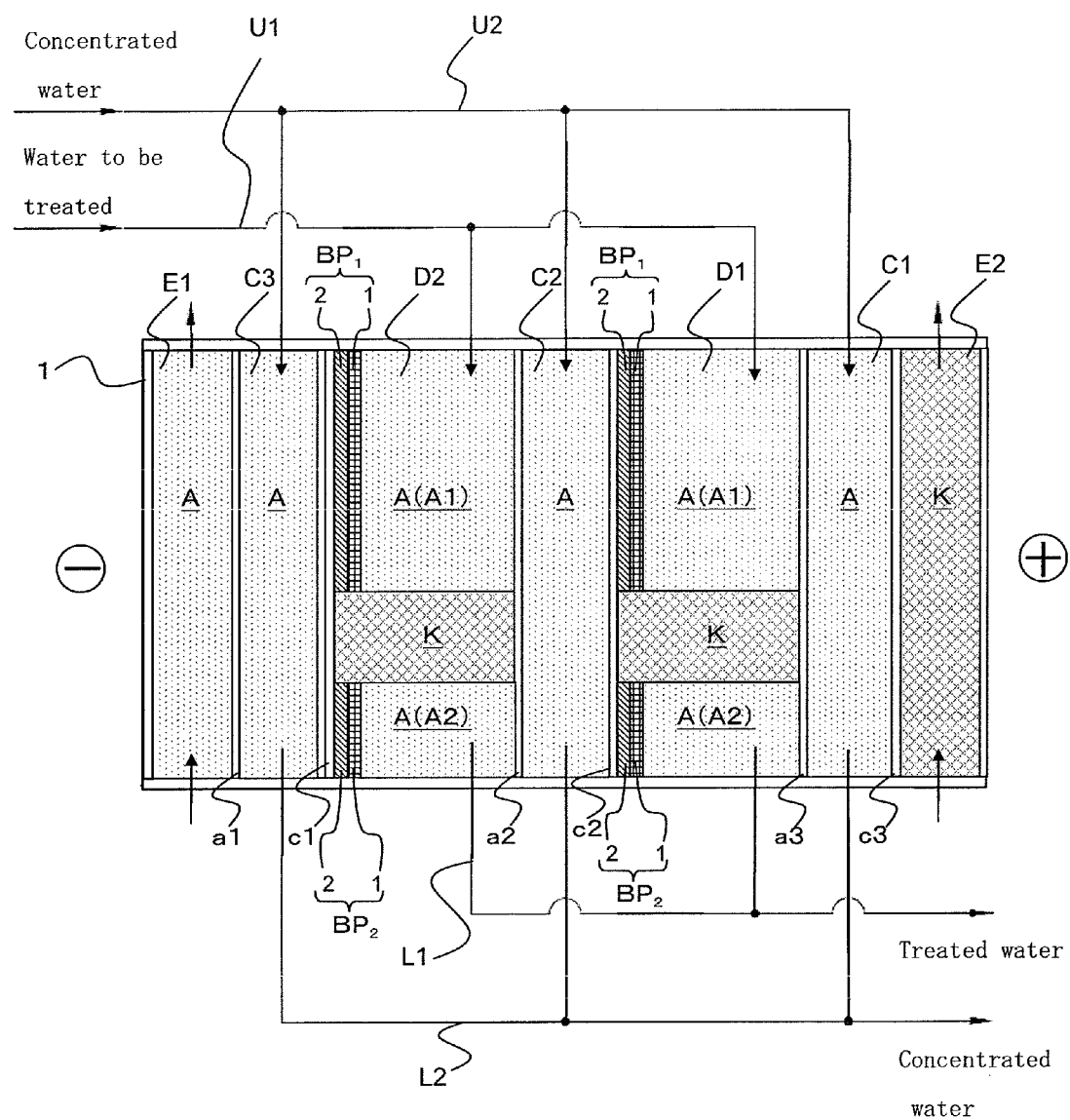
FIG. 2 is a schematic configuration view showing another example of the deionized water production apparatus according to the embodiment of the present invention.

FIG. 2 is a schematic block diagram showing the deionized water production apparatus according to the embodiment. The deionized water production apparatus shown in FIG. 2 includes two deionization treatment units between cathode chamber E1 and anode chamber E2. Of the two deionization treatment units, a first deionization treatment unit relatively located on the anode side includes deionization chamber D1 and a pair of concentration chambers C1 and C2 adjacent to both sides of deionization chamber D1. On the other hand, a second deionization treatment unit relatively located on the cathode side includes deionization chamber D2 and a pair of concentration chambers C2 and C3 adjacent to both sides of deionization chamber D2.

Deionization chambers D1 and D2 constituting the respective deionization treatment chambers are similar in configuration to deionization chamber D shown in FIG. 1. That is, in each of deionization chambers D1 and D2, anion layer A and cation layer K are alternately stacked along the passing direction of water to be treated. More specifically, first anion layer A1 is disposed at the front stage of the water passing direction, cation layer K is disposed at the middle stage of the water passing direction, and second anion layer A2 is disposed at the rear stage of the water passing direction. Thus, in the deionized water production apparatus according to the embodiment, as in the aforementioned case, the water to be treated that has flowed into deionization chambers D1 and D2 passes through anion layer A1, cation layer K, and anion layer A2 in this order.

Further, in each of deionization chambers D1 and D2, first bipolar membrane $BP_1$ and second bipolar membrane $BP_2$ are arranged. Specifically, first bipolar membrane $BP_1$ in deionization chamber D1 is disposed between anion layer A1 and second cation exchange membrane c2. Second bipolar membrane $BP_2$ is disposed between anion layer A2 and second cation exchange membrane c2. On the other hand, no bipolar membrane is disposed between cation layer K and an ion exchange membrane.

First bipolar membrane $BP_1$ in deionization chamber D2 is disposed between anion layer A1 and first cation exchange membrane c1. Second bipolar membrane $BP_2$ is disposed between anion layer A2 and first cation exchange membrane c1. On the other hand, no bipolar membrane is disposed between cation layer K and an ion exchange membrane in deionization chamber D2.

Next, an outline of the main flow of the water to be treated, treated water, and concentrated water in the deionized water production apparatus shown in FIG. 2 will be described. The water to be treated is supplied into deionization chambers D1 and D2 after the water is passed through a RO (Rverse Osmosis) membrane, and is then passed through deionization chambers D1 and D2. The water to be treated, which has passed through deionization chambers D1 and D2, is discharged out of the system as treated water. The concentrated water is supplied to concentration chamber C1, concentration chamber C2 and concentration chamber C3 in parallel, and passed through concentration chambers C1 to C3 to be discharged out of the system.

Some flow channels U1 and U2 and L1 and L2 are arranged for supplying the water to be treated, the treated water and the concentrated water as described above. In FIG. 2, flow channel U1 shown above the deionized water production apparatus has one end connected to the supply port of the water to be treated, and the other end side branched in the midway to be connected to deionization chambers D1 and D2. Flow channel L1 shown below the deionized water production apparatus has one end connected to deionization chambers D1 and D2, and the other end side merged in the midway to be connected to the discharge port of the treated water. Flow channel U2 shown above the deionized water production apparatus has one end connected to the supply port of the concentrated water, and the other end side branched in the midway to be connected to concentration chambers C1, C2 and C3 Flow channel L2 shown below the deionized water production apparatus has one end connected to concentration chambers C1, C2, and C3 and the other end side merged in the midway to be connected to the discharge port of the concentrated water. Though not shown, a flow channel for supplying electrode water and a flow channel for discharging the supplied electrode water are respectively connected to cathode chamber E1 and anode chamber E2.

In the deionized water production apparatus according to the embodiment, as in the aforementioned case, the anion layer in each deionization chamber is in contact not with the cation exchange membrane but with the anion exchange membrane of the bipolar membrane. Thus, a biased flow of electric current is removed or reduced due to increases in the amount of current that flows through the anion layers.

In the deionized water production apparatus according to the embodiment, as in the aforementioned case, a part of the ion exchange membrane that partitions the deionization chamber and the concentration chamber from each other can be replaced with a bipolar membrane. For example, parts (parts in contact with anion layers A1 and A2) of first cation exchange membrane c1 and second cation exchange membrane c2 shown in FIG. 2 can be replaced with bipolar membranes.

Third Embodiment

Hereinafter, another example of a deionized water production apparatus according to the embodiment of the present invention will be described referring to the drawings. The deionized water production apparatus according to this embodiment has a basic configuration similar to that of the deionized water production apparatus according to the second embodiment. Substantial differences between the deionized water production apparatus according to this embodiment and the deionized water production apparatus according to the second embodiment are the following two. One difference is that three deionization treatment units are arranged between a cathode chamber and an anode chamber in the deionized water production apparatus according to this embodiment. The other difference is that a concentration chamber also serves as an electrode chamber in the deionized water production apparatus according to this embodiment.

Figure 3:
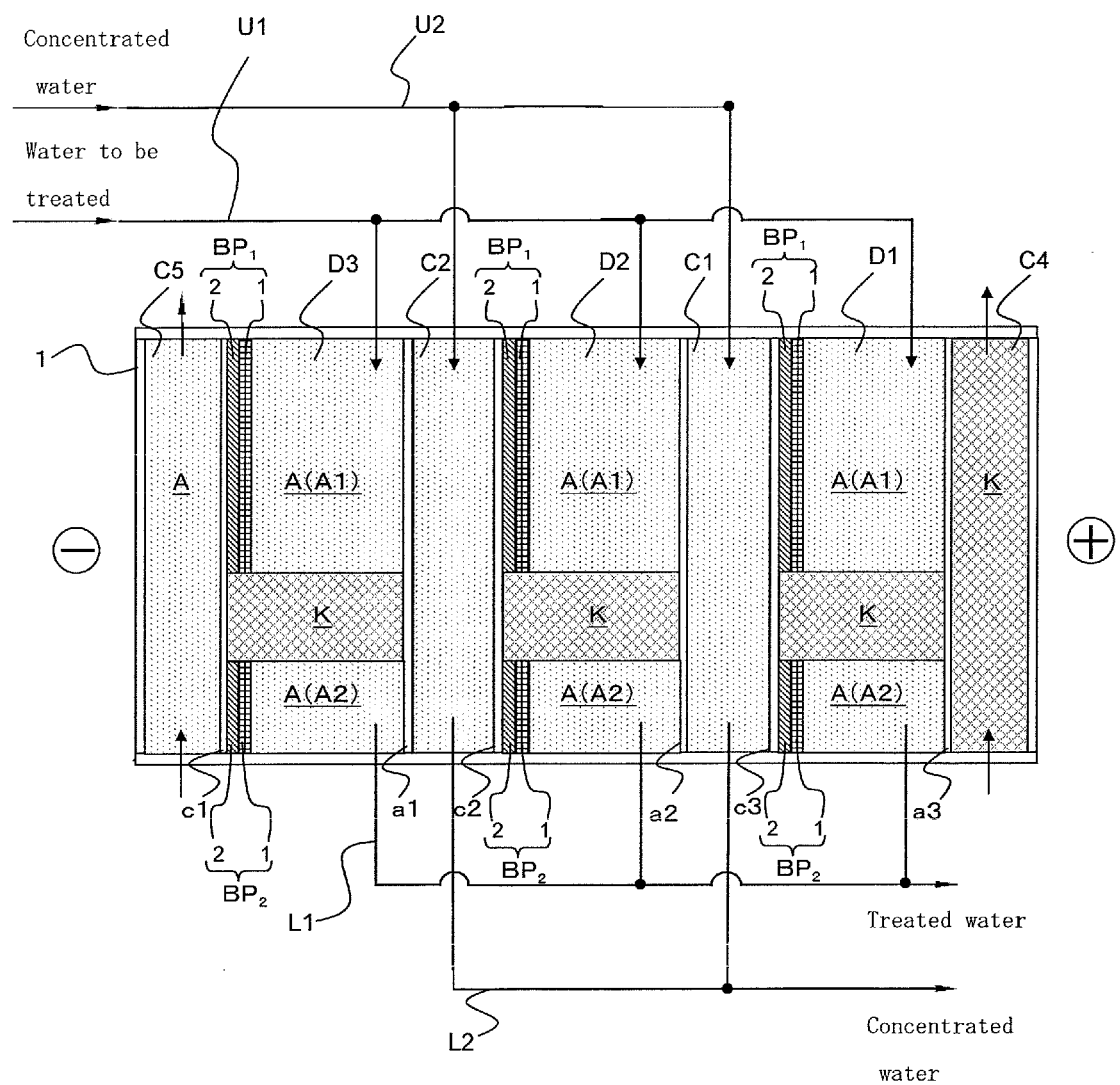
FIG. 3 is a schematic configuration view showing further example of the deionized water production apparatus according to the embodiment of the present invention.

FIG. 3 is a schematic block diagram showing the deionized water production apparatus according to the embodiment. The deionized water production apparatus shown in FIG. 3 includes three deionization treatment units between cathode chamber E1 and anode chamber E2. Among the three deionization treatment units, a first deionization treatment unit located at the center includes deionization chamber D2 and a pair of concentration chambers C1 and C2 adjacent to both sides of deionization chamber D2. A second deionization treatment unit located nearer to the anode side than the first deionization treatment unit includes deionization chamber D1 and a pair of concentration chambers C1 and C4 adjacent to both sides of deionization chamber D1.

A third deionization treatment unit located nearer to the cathode side than the first deionization treatment unit includes deionization chamber D3 and a pair of concentration chambers C2 and C5 adjacent to both sides of deionization chamber D3.

Concentration chamber C4 is filled with a cation exchanger, and an anode plate is provided in concentration chamber C4. Concentration chamber C5 is filled with an anion exchanger, and a cathode plate is provided concentration chamber C5. In other words, concentration chamber C4 also serves as an anode chamber, while concentration chamber C5 also serves as a cathode chamber.

An anode plate can be disposed to also serve as an anode chamber in concentration chamber C1 shown in FIG. 1, and a cathode plate can be disposed to also serve as a cathode chamber in concentration chamber C2. An anode plate can be disposed to also serve as an anode chamber in concentration chamber C1 shown in FIG. 2, and a cathode plate can be disposed to also serve as a cathode chamber in concentration chamber C3. In these cases, the concentration chambers that also serve as the anode chambers are filled with cation exchangers.

In the deionized water production apparatus according to the embodiment, as in the aforementioned case, deionization chambers D1, D2 and D3 have configurations similar to deionization chamber D shown in FIG. 1. That is, in each of deionization chambers D1 D2, and D3, anion layer A and cation layer K are alternately stacked along the passing direction of the water to be treated. More specifically, first anion layer A1 is disposed at the front stage of the water passing direction, cation layer K is disposed at the middle stage of the water passing direction, and second anion layer A2 is disposed at the rear stage of the water passing direction. Thus, in the deionized water production apparatus according to the embodiment, the water to be treated that has flowed into deionization chambers D1, D2, and D3 passes through anion layer A1, cation layer K, and anion layer A2 in this order.

Further, in each of deionization chambers D1, D2 and D3, first bipolar membrane $BP_1$ and second bipolar membrane $BP_2$ are arranged. Specifically, first bipolar membrane $BP_1$ in deionization chamber D1 is disposed between anion layer A1 and third cation exchange membrane c3. Second bipolar membrane $BP_2$ is disposed between anion layer A2 and third cation exchange membrane c3. No bipolar membrane is disposed between cation layer K and an ion exchange membrane in deionization chamber D1.

First bipolar membrane $BP_1$ in deionization chamber D2 is disposed between anion layer A1 and second cation exchange membrane c2. Second bipolar membrane $BP_2$ is disposed between anion layer A2 and second cation exchange membrane c2. No bipolar membrane is disposed between cation layer K and an ion exchange membrane in deionization chamber D2.

Further, first bipolar membrane $BP_1$ in deionization chamber D3 is disposed between anion layer A1 and first cation exchange membrane c1. Second bipolar membrane $BP_2$ is disposed between anion layer A2 and first cation exchange membrane c1. No bipolar membrane is disposed between cation layer K and an ion exchange membrane in deionization chamber D3.

The flow of the water to be treated, the treated water, and the concentrated water and the flow channel configuration in the deionized water production apparatus according to the embodiment are substantially similar to those of the deionized water production apparatus according to the second embodiment, and thus description thereof will be omitted.

Fourth Embodiment

The case where the bipolar membrane is disposed between the anion layer and the cation exchange membrane when three or more anion and cation layers are stacked in the deionization chamber has been described. However, electric resistance in the deionization chamber changes due to various factors. On the other hand, the object of the present invention is to achieve an operation with a low voltage and a high current density by removing or reducing a biased flow of electric current in the deionization chamber. Thus, a bipolar membrane can be additionally disposed between the cation layer and the anion exchange membrane when necessary, and this form is also within the present invention.

Figure 4A:
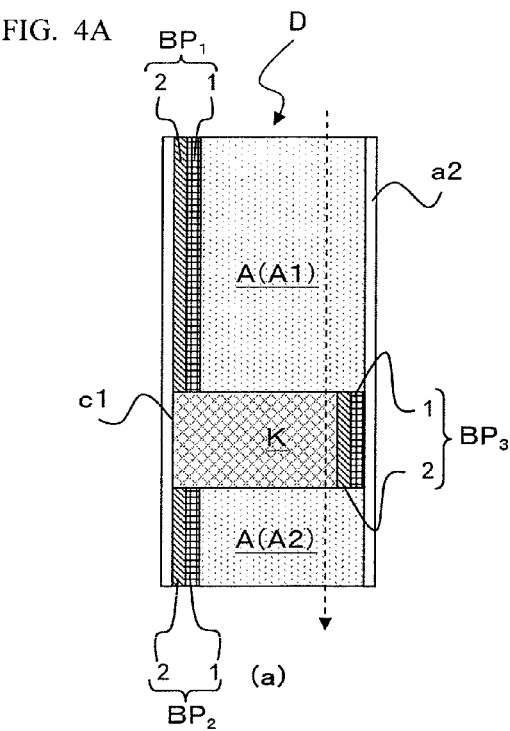
FIGS. 4A to 4C are schematic views each showing a modified example of a deionization chamber.
Figure 4B:
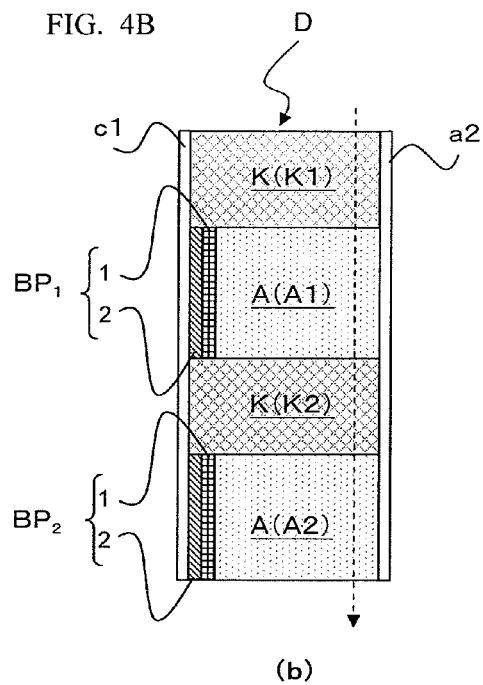
Figure 4C:
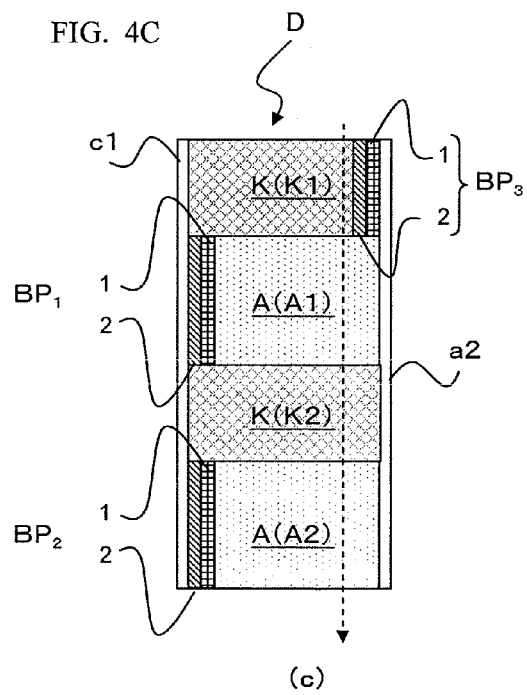

FIGS. 4A to 4C show modified examples of deionization chamber D shown in FIG. 1. A chain line shown indicates the passing direction of water to be treated in deionization chamber D.

In deionization chamber D shown in FIG. 4A, anion layer A and cation layer K are alternately stacked along the passing direction of the water to be treated. More specifically, first anion layer A1 is disposed at the front stage of the water passing direction, cation layer K is disposed at the middle stage of the water passing direction, and second anion layer A2 is disposed at the rear stage of the water passing direction.

Three bipolar membranes BP are arranged in deionization chamber D. First bipolar membrane $BP_1$ is disposed between anion layer A1 and first cation exchange membrane c1. Second bipolar membrane $BP_2$ is disposed between anion layer A2 and first cation exchange membrane c1. Third bipolar membrane $BP_3$ is disposed between cation layer K and second anion exchange membrane a2.

First bipolar membrane $BP_1$ and second bipolar membrane $BP_2$ are arranged so that anion exchange membrane 1 can be in contact with anion layer A. Third bipolar membrane $BP_3$ is arranged so that cation exchange membrane 2 can be in contact with cation layer K.

In deionization chamber D shown in FIG. 4B, anion layer A and cation layer K are alternately stacked in four layers along the passing direction of the water to be treated. More specifically, first cation layer K1, first anion layer A1, second cation layer K2, and second anion layer A2 are arranged along the passing direction of the water to be treated in this order.

In deionization chamber D, two bipolar membranes BP are arranged. First bipolar membrane $BP_1$ is disposed between anion layer A1 and first cation exchange membrane c1. Second bipolar membrane $BP_2$ is disposed between anion layer A2 and first cation exchange membrane c1. Further, first bipolar membrane $BP_1$ and second bipolar membrane $BP_2$ are arranged so that anion exchange membrane 1 can be in contact with anion layer A. No bipolar membrane is disposed between cation layers K1 and K2 and second anion exchange membrane a2.

In deionization chamber D shown in FIG. 4C, anion layer A and cation layer K are alternately stacked in four layers along the passing direction of the water to be treated. More specifically, first cation layer K1, first anion layer A1, second cation layer K2, and second anion layer A2 are arranged along the passing direction of the water to be treated in this order.

In deionization chamber D, three bipolar membranes BP are arranged. First bipolar membrane $BP_1$ is disposed between anion layer A1 and first cation exchange membrane c1. Second bipolar membrane $BP_2$ is disposed between anion layer A2 and first cation exchange membrane c1.

Third bipolar membrane BP₃ is disposed between cation layer K1 and second anion exchange membrane a2.

Further, first bipolar membrane BP₁ and second bipolar membrane BP₂ are arranged so that anion exchange membrane 1 can be in contact with anion layer A. Third bipolar membrane BP₃ is arranged so that cation exchange membrane 2 can be in contact with cation layer K1. No bipolar membrane is disposed between cation layer K2 and second anion exchange membrane a2.

The thickness of the deionization chamber or the concentration chamber that comprises the electrodeionization apparatus for producing deionized water according to the present invention can be freely changed. For example, in each of the embodiments, each chamber is formed by one frame work. However, the thickness of the chamber can be increased by using a plurality of stacked frame works to form an arbitrary chamber.

(Comparison Test)

To confirm the effect of the present invention, the following comparison test was carried out. First, as the deionized water production apparatus according to the present invention, two deionized water production apparatuses were prepared. One is the deionized water production apparatus shown in FIG. 1, and referred to as "Example 1" hereinafter. The other is a deionized water production apparatus where deionization chamber D shown in FIG. 1 is replaced with deionization chamber D shown in FIG. 4B, and referred to as "Example 2" hereinafter.

Further, as comparative examples, two deionized water production apparatuses were prepared. One is a deionized water production apparatus that is different from Example 1 only in the configuration of a deionization chamber, and referred to as "Comparative Example 1" hereinafter. The other is a deionized water production apparatus that is different from Example 2 only in the configuration of a deionization chamber, and referred to as "Comparative Example 2" hereinafter.

Figure 5A:
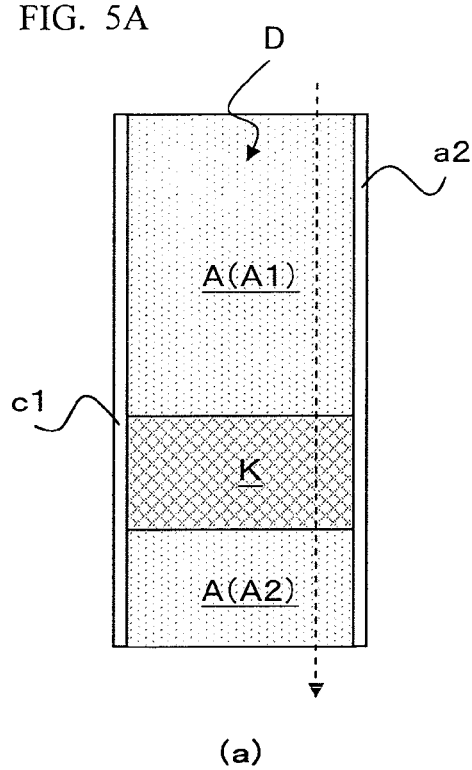
FIGS. 5A and 5B are schematic views each showing a comparative example.
Figure 5B:
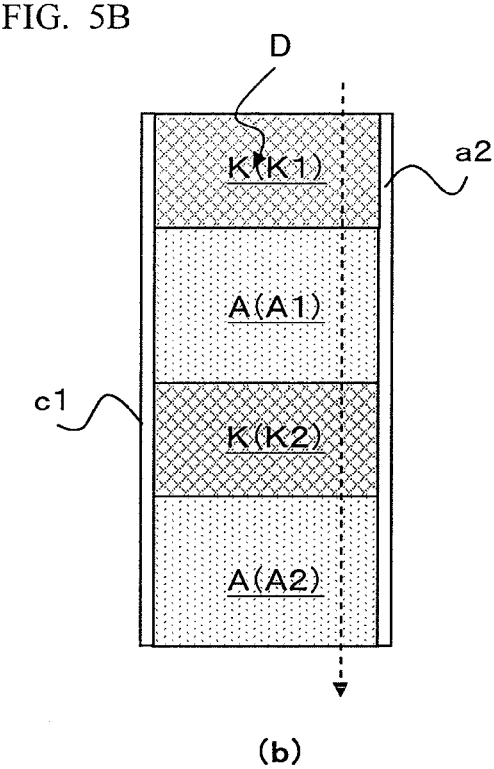
Figure 6:
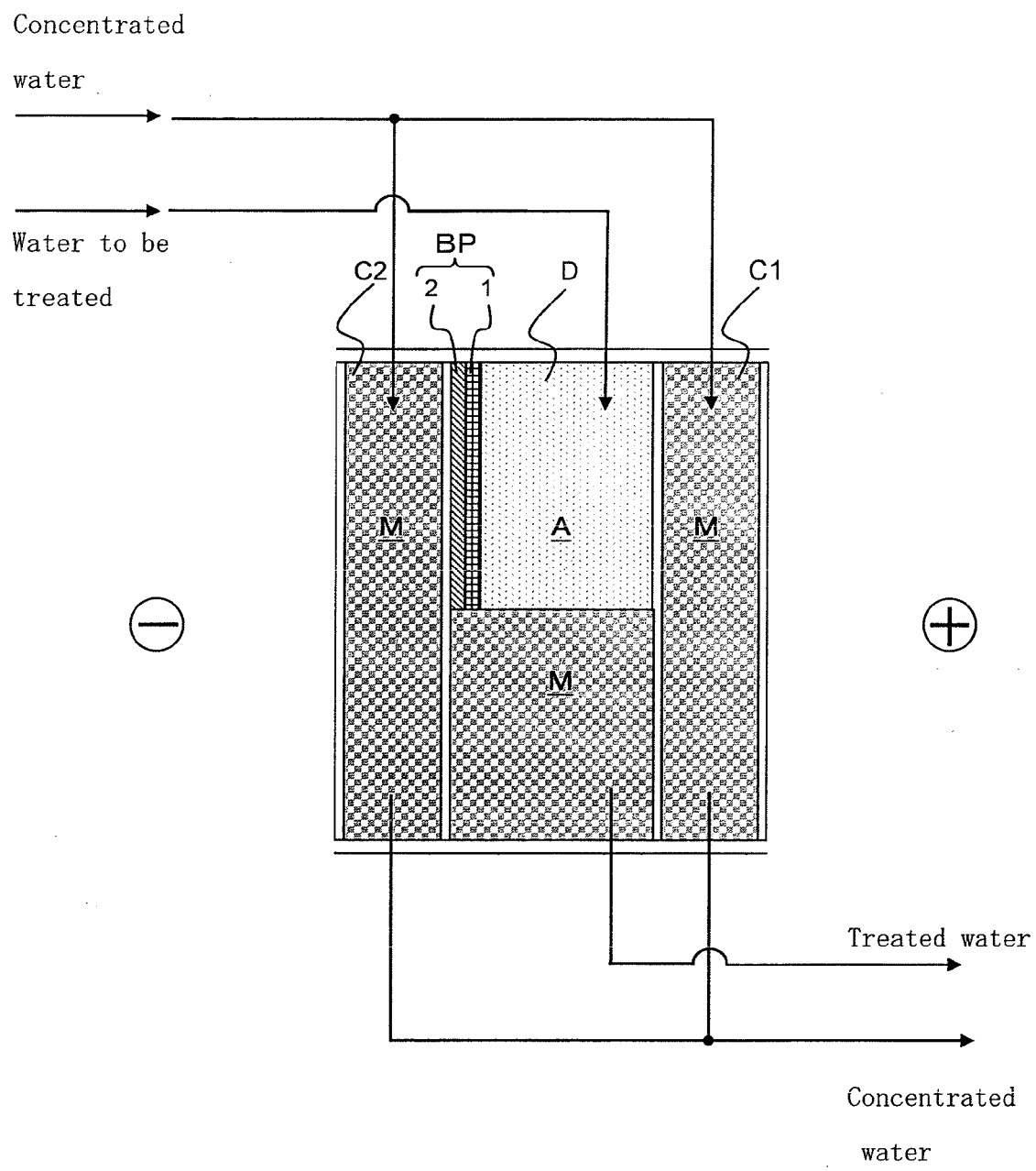
FIG. 6 is a schematic block diagram showing a deionized water production apparatus described in Patent Literature 1.

FIG. 5A shows the configuration of deionization chamber D according to Comparative Example 1, and FIG. 5B shows the configuration of deionization chamber D according to Comparative Example 2. As is apparent from FIG. 5A, the difference between Example 1 and Comparative Example 1 is only the presence or absence of a bipolar membrane in deionization chamber D. As is apparent from FIG. 5B, the difference between Example 2 and Comparative Example 2 is only the presence or absence of a bipolar membrane in deionization chamber D.

In the current comparison test, conditions on specifications, the passing water flow rate, and supply water common between Examples 1 and 2 and Comparative Examples 1 and 2 are as follows. CER is the abbreviation of the cation exchanger (cation exchange resin), and AER is the abbreviation of the anion exchanger (anion exchange resin).

Anode chamber: size 100×300×4 mm filled with CER

Cathode chamber: size 100×300×4 mm filled with AER

Deionization chamber: size 100×300×8 mm filled with AER/CER (stacked)

Concentration chamber: size 100×300×4 mm filled with AER

Deionization chamber flow rate: 100 L/h (Double-Pass RO permeated water 5±1 μS/cm)

Concentration chamber flow rate: 10 L/h (Double-Pass RO permeated water 5±1 μS/cm)

Electrode chamber flow rate: 10 L/h (Double-Pass RO permeated water 5±1 μS/cm)

Applied current value: 3 A

Under these conditions, the apparatuses of Examples 1 and 2 and Comparative Examples 1 and 2 were continuously operated for 200 hours, and the operation voltages and treated water quality, at the time when the operation was started and after 200 hours passed since the start, were measured. Table 1 shows the measuring results.

As can be understood from Table 1, the voltage increase was limited even after the operation of 200 hours in the configuration where the bipolar membrane was disposed (Examples 1 and 2), and high treated water quality was obtained. On the other hand, the voltage increased, and treated water quality was low in the configuration where no bipolar membrane was disposed (Comparative Examples 1 and 2).

TABLE 1

|  |  | Example 1 | Example 2 | Comparative Example 1 | Comparative Example 2 |
|---|---|---|---|---|---|
| Operation voltage [V] | At time of operation start | 7.5 | 8.0 | 12.3 | 11.8 |
|  | after 200 hours | 16.8 | 18.9 | 131.0 | 120.0 |
| Electrical resistivity of water to be treated [MΩ · cm] | At time of operation start | 17.8 | 17.9 | 17.6 | 17.7 |
|  | after 200 hours | 17.9 | 18.1 | 0.98 | 1.4 |

The preferred embodiments of the present invention have been described in detail. It should be understood, however, that various changes and modifications can be made to the invention without departing from the spirit and in scope of the appended claims.

This application claims priority from Japanese Patent Application No. 2011-170943 filed Aug. 4, 2011, which is hereby incorporated by reference herein in its entirety.

REFERENCE NUMERALS

10 Frame work
A Anion exchanger (anion layer)
K Cation exchanger (cation layer)
BP Bipolar membrane
E1 Cathode chamber
E2 Anode chamber
C1 to C5 Concentration chamber
D Deionization chamber
D1 to D3 Deionization chamber
a1 to a3 Anion exchange membrane
c1 to c3 Cation exchange membrane
U1 to U2, L1 to L2 Flow channel

The invention claimed is:

1. An electrodeionization apparatus for producing deionized water comprising:
at least one deionization treatment unit disposed between a cathode and an anode, the deionization treatment unit including a deionization chamber and a pair of concentration chambers adjacent to both sides of the deionization chamber,
wherein in the deionization chamber,
at least one anion exchanger layer and at least one cation exchanger layer are stacked in an order in which a last ion exchanger layer through which water to be treated passes is the anion exchanger layer; and no bipolar membrane is disposed adjacent the at least one cation exchanger layer in the deionization chamber, wherein a bipolar membrane is formed on the cathode side of the at least one anion exchanger layer in the deionization chamber, and an anion exchange membrane of the bipolar membrane is in contact with the at least one anion exchanger layer, wherein an electrical resistance of the at least one anion exchanger layer is higher than an electrical resistance of the at least one cation exchanger layer, wherein the bipolar membrane removes or reduces a biased flow of electric current between the at least one anion exchanger layer and the at least one cation exchanger layer, wherein at least two or more anion exchanger layers are provided in the deionization chamber, and for each anion exchange layer, a corresponding bipolar membrane is formed on a cathode side of each anion exchanger layer, and wherein:
at least two or more cation exchanger layers are provided in the deionization chamber, and for each said two or more cation exchanger layer another bipolar membrane is formed on an anode side of the respective said two or more cation exchanger layer; and a cation exchange membrane of the another bipolar membrane disposed on the anode side of the at least one cation exchanger layer is in contact with the at least one cation exchanger layer.

2. The electrodeionization apparatus for producing deionized water according to claim 1, wherein the bipolar membrane divides or partitions the deionization chamber from one of the pair of concentration chambers.

* * * * *